United States Patent [19]

Kimura

[11] Patent Number: 4,583,828
[45] Date of Patent: Apr. 22, 1986

[54] FOCUS ADJUSTING DEVICE FOR BINOCULAR

[75] Inventor: Hideyuki Kimura, Ichikawa, Japan

[73] Assignee: Tokyo Bussan Kabushiki Kaisha, Tokyo, Japan

[21] Appl. No.: 523,162

[22] Filed: Aug. 15, 1983

[30] Foreign Application Priority Data

Aug. 20, 1982 [JP] Japan .......................... 57-126319[U]

[51] Int. Cl.$^4$ ............................................. G02B 7/02
[52] U.S. Cl. ................................................... 350/552
[58] Field of Search ............... 350/552, 548, 545, 549, 350/550, 551, 554, 555

[56] References Cited

U.S. PATENT DOCUMENTS

| 782,553 | 2/1905 | Glocker | 350/556 |
| 4,066,329 | 1/1978 | Van Exel | 350/552 |
| 4,240,690 | 12/1980 | Kimura | 350/552 |
| 4,262,990 | 4/1981 | Kamakura | 350/552 |

Primary Examiner—John K. Corbin
Assistant Examiner—Vincent J. Lemme
Attorney, Agent, or Firm—Polster, Polster and Lucchesi

[57] ABSTRACT

A binocular belonging to one type is provided with a focus adjusting device which allows one to select a desired ocular lens feed rate. A single annular piece is included in the device to be rotated by a manually operated focus adjusting ring to in turn drive a shaft associated with ocular lens barrels in a reciprocal movement. A bunch of such exchangeable annular pieces are prepared each being formed with a helical slot which differs in pitch from helical slots in the others.

10 Claims, 6 Drawing Figures

4,583,828

FOCUS ADJUSTING DEVICE FOR BINOCULAR

BACKGROUND OF THE INVENTION

1. Field of the Invention

The present invention relates to a focus adjusting device for a binocular and, more particularly, to an improved focus adjusting mechanism which allows one to readily focus a binocular in a manner suitable for a specific kind of an intended object.

2. Description of the Prior Art

When a binocular is used to view an object which is generally stationary, primary importance is usually placed on fine focus adjustment rather than on the quick focus adjustment. For the fine focus adjustment, ocular lenses of a binocular should preferably stroke back and forth over a relatively short distance per unit rotation angle of a focus adjusting ring. It will be adequate, for example, that one or two rotations of the ring cause the ocular lenses to move over the whole predetermined stroke. Hereinafter, the stroke of the ocular lenses per unit rotation angle of the ring will be referred to as the "ocular lens feed rate" for convenience.

On the other hand, where the telescopic object is quick moving such as, for example, sport competition, horse racing, theatrical performances, and others, quick adjustment is more desired than the fine adjustment so that one can sharply focus the binocular to a movement of the object while chasing it. In this case, a relatively large ocular lens feed rate is preferred such as one which allows the whole predetermined range of ocular lens stroke to be covered by about one half the rotation of the ring or less.

The conflicting demands discussed above may at once be met by manufacturing one type of binoculars with different ocular lens feed rates. Manufacturers in the industry concerned have avoided this, however, because the focus adjusting mechanism and thereby the specifications of various parts and assembling steps have to be matched to each of the different ocular lens feed rates. This has allowed users no control over the choice of the ocular lens feed rates in one type of binoculars.

SUMMARY OF THE INVENTION

It is therefore an object of the present invention to provide a focus adjusting mechanism for a binocular which furnishes the binocular with selective ocular lens feed rates by making a single and simple element of the binocular replaceable with another, without any modification to the other parts in design or assembly.

In accordance with the present invention, a binocular belonging to one type is provided with a focus adjusting device which allows one to select a desired ocular lens feed rate. A single annular piece is included in the device to be rotated by a manually operated focus adjusting ring to in turn drive a shaft associated with ocular lens barrels in a reciprocal movement. A bunch of such exchangeable annular pieces are prepared each being formed with a helical slot which differs in pitch from helical slots in the others.

A focus adjusting device embodying the present invention is applicable to a binocular having a pair of object lens barrels each of which is formed with a pair of spaced front and rear connecting brackets, a hollow cylindrical shaft mounted to the brackets to interconnect the object lens barrels to each other, a shaft received in the hollow shaft to reciprocate back and forth relative to the hollow shaft, a pair of retaining brackets for retaining ocular lens barrels and mounted to a rear end portion of the reciprocal shaft to be rotatable under a predetermined magnitude of resistance, and an adjusting mechanism for selectively varying a distance of movement of the reciprocal shaft relative to the hollow shaft. The focus adjusting device comprises a hole formed in a side wall of the reciprocal shaft inside the hollow shaft, an elongate slot formed through a side wall of the hollow shaft, an annular piece coupled over the hollow shaft and formed with a hole which is located in alignment with the elongate slot of the hollow shaft and the hole of the reciprocal shaft, a lock pin passed through the hole of the annular piece, the elongate slot of the hollow shaft and the hole of the reciprocal shaft in order to integrally lock the annular piece and the reciprocal shaft to each other, a focus adjusting ring rotatably coupled over the hollow shaft, and rotation transmitting means for converting rotation of the focus adjusting ring to translation of the annular piece, hence the reciprocal shaft.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENT

Figure 1:
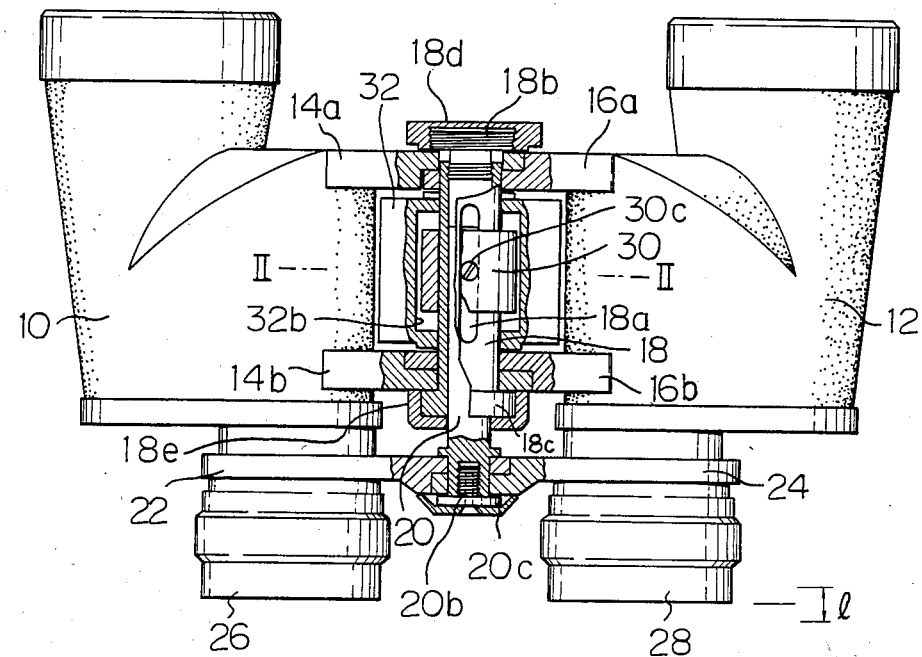
FIG. 1 is a partly taken away plan view of a binocular in which a focus adjusting device of the present invention is installed.
Figure 2:
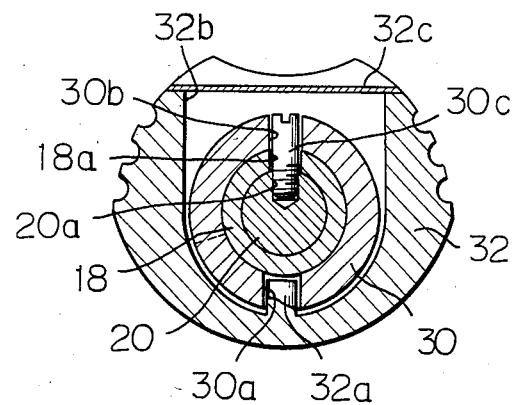
FIG. 2 is a fragmentary enlarged section along line II—II of FIG. 1.
Figure 3:
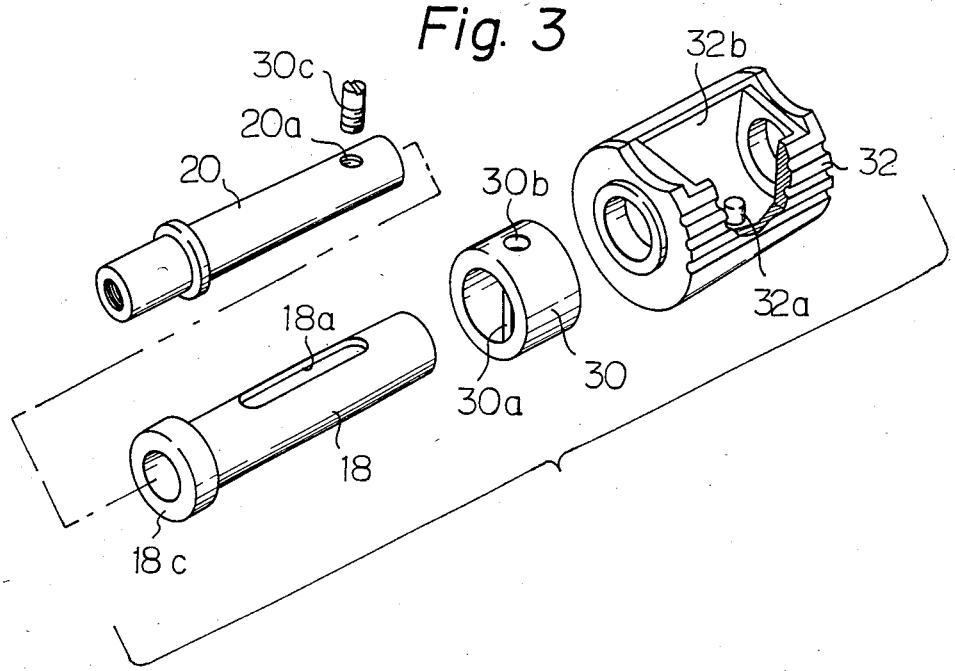
FIG. 3 is a fragmentary exploded perspective view of the focus adjusting device of the present invention.

Referring to the drawings, there is shown a binocular furnished with a focus adjusting device of the present invention. The binocular includes a pair of left and right main barrels or object lens barrels 10 and 12 which individually accommodate a pair of monocular prism telescopes therein. Spaced brackets 14a and 14b extend out from the right main barrel 10, and spaced brackets 16a and 16b from the left main barrel 12. The brackets 14a and 16a adjacent to the front end of the binocular are mated together at their adjacent free ends, and so are the brackets 14b and 16b adjacent to the rear end of the binocular, thereby connecting the main barrels 10 and 12 to each other. The mated ends of the brackets 14a and 16a and those of the brackets 14b and 16b are formed with aligned holes through which a hollow cylindrical shaft 18 is passed to interconnect the brackets and thereby the barrels. An elongate slot 18a extends axially through the wall of the hollow shaft 18. A shaft 20 is received in the hollow shaft 18 to axially reciprocate therealong. The rear end of this shaft 20 is supported by mated inner ends of brackets 22 and 24. Ocular lens barrels 26 and 28 are held and interconnected by the brackets 22 and 24.

An annular piece 30 is coupled over the hollow shaft 18 and formed with a helical slot 30a and a hole 30b therethrough. A lock pin 30c extends throughout the hole 30b of the annular piece 30 and the elongate slot 18a of the hollow shaft 18 into threaded engagement with a hole 20a, which is formed in the shaft 20, thereby integrally connecting the annular piece 30 to the shaft 20. A manipulatable focus adjusting ring 32 is rotatably coupled over the hollow shaft 18. A second pin 32a is studded on a base portion of the ring 32 to be received in the helical slot 30a of the annulus 30. A slip-preventive screw 18b is threaded into the front end of the hollow shaft 18. A second slip-preventive screw 20b is threaded into the rear end of the shaft 20 so as to prevent separation of the brackets 22 and 24.

With the above construction, the right and left main barrels 10 and 12 are commonly hinged to the hollow shaft 18 to be freely swingable thereabout under a suitable magnitude of resistance, thereby adjusting the interpupillary span as desired.

The helically slotted piece 30 surrounds the hollow shaft 18 in a position between the front connecting bracket pair 14a and 16a and the rear connecting bracket pair 14b and 16b. The focus adjusting ring 32 comprises a hollow body whose axial length is substantially identical with the distance between the front bracket pair 14a and 16a and the rear bracket pair 14b and 16b. Receiving the slotted piece 30 thereinside, the ring 32 is angularly movable about the axis of the hollow shaft 18 but not therealong.

In assembly, the right and left main barrels 10 and 12 of the binocular are positioned such that the front brackets 14a and 16a and the rear brackets 14b and 16b are individually mated together with their holes for the hollow shaft 18 aligned to each other. Meanwhile, the helically slotted piece 30 is put into the ring 32 through a window 32b formed through the wall of the ring 32, the pin 32a being brought into engagement with the helical slot 30a. The ring 32 with the piece 30 is placed between the front bracket pair 14a and 16a and the rear bracket pair 14b and 16b. Then, the hollow shaft 18 is inserted into the aligned holes of the rear bracket pair 14b and 16b to pass through the ring 32, piece 30 inside the ring 32, and rear bracket pair 14a and 16a, until an annular flange 18c at the rear end of the hollow shaft 18 abuts against the rear end of the bracket pair 14b and 16b. Under this condition, the slip-preventive screw 18b is threaded into the front end of the hollow shaft 18. This is followed by inserting the shaft 20 into the hollow shaft 18 and aligning the hole 30b of the piece 30 and the hole 20a of the shaft 20 to each other with the intermediary of the elongate slot 18a of the shaft 18. Afterwards, the pin 30c is inserted into the window 32b of the ring 32 to be threaded into the hole 20a in the shaft 20 via the hole 30b of the piece 30. This sets up an integral construction of the piece 30 and the shaft 20 inside the hollow shaft 18.

The next step is coupling the rear end of the shaft 20 into the holes in the mated ends of the brackets 22 and 24 and then fitting the slip-preventive screw into the rear end of the shaft 20. The brackets 22 and 24, like the brackets 14 and 16, are freely swingable about the shaft 20. After the procedure so far described, a closure member or lid 32c is fit on the ring 32 so as to cover up the window 32b. If necessary, caps 18d and 18e may be respectively fit to the screw 18b and flange 18c for ornamental purpose. Also, a cap 20c may be fit to the screw 20b to provide visible indication of refraction angles thereon in addition to ornamentation.

In use, as the ring 32 is manually rotated clockwise about the hollow shaft 18 for focusing purpose, the pin 32a studded on the inner wall of the ring 32 moves clockwise to cause the piece 30 into a rearward movement along the shaft 18 due to the locking engagement of the pin 32a in the helical slot 30a. This movement of the piece 30 is accompanied by a rearward stroke of the shaft 20 which occurs through the pin 30c, so that the right and left ocular lens barrels 26 and 28 are moved rearwardly away from main barrels 10 and 12 through the brackets 22 and 24. Conversely, when the ring 32 is rotated counterclockwise, the piece 30 moves forward along the hollow shaft 18 and thereby moves the shaft 20 forwardly. This allows the ocular lens barrels 26 and 28 to stroke forwardly toward the main barrels 10 and 12.

Figure 4A:
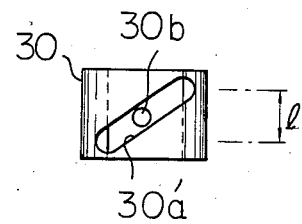
FIGS. 4a–4c are side elevations of examples of helically slotted pieces which are interchangeably applied to the focus adjusting device of the present invention.
Figure 4B:
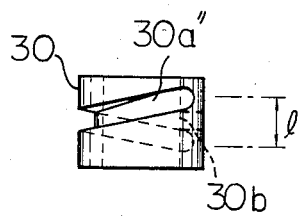
Figure 4C:
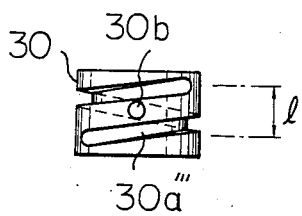

Assume that the ocular lens barrels stroke together a distance 1 which covers the whole range required for the focus adjustment of the binocular. In accordance with the present invention, a selection of exchangeable pieces 30 are prepared such as those shown in FIGS. 4a–4c by way of example. The piece 30 shown in FIG. 4a is formed with a helical slot 30'a which is designed to permit the ring 32 to rotate 0–120 or 0–180 degrees within the lengthwise dimension 1 of the piece 30, i.e., half a rotation or less. The piece 30 shown in FIG. 4b is formed with a helical slot 30''a which permits the ring 32 to rotate substantially one rotation within the dimension 1. Further, the piece 30 shown in FIG. 4c is formed with a helical slot 30'''a which permits the ring 32 to rotate one rotation and a half within the dimension 1. Thus, the helical slots 30'a–30'''a are provided with pitches different from each other. Where the piece 30 having a comparatively rough pitch as shown in FIG. 4a is mounted in the binocular, substantially half a rotation of the ring 32 covers the whole predetermined range of stroke 1 of the ocular lens barrels thereby promoting a quick focusing operation, rather than fine adjustment. Meanwhile, where the piece 30 having a comparatively dense pitch as shown in FIG. 4b or 4c is used, one or more rotations of the ring 32 allow the ocular lens barrels to stroke the distance 1. The dense pitches, therefore, offer the capability of fine focus adjustment, rather than the quickness.

In summary, it will be seen that the present invention provides a binocular whose ocular lens feed rate is variable merely by replacing one simple member, i.e., the helically slotted piece 30, and promotes the ease of quantity production of such binoculars without any modification to the other parts or the manner of assembly. The user, therefore, is capable of focusing a binocular, which belongs to a certain type, with a specific ocular lens feed rate matching to an object.

What I claim is:

1. A focus adjusting device for a binocular having a pair of object lens barrels each of which is formed with a pair of spaced front and rear connecting brackets, a pair of ocular lens barrels, and a pair of retaining brackets for retaining the ocular lens barrels, comprising:

a hollow cylindrical shaft mounted to the connecting brackets to interconnect the object lens barrels to each other, said hollow shaft having an elongated slot formed through a side wall thereof along the longitudinal axis thereof;

a reciprocal shaft received in said hollow shaft to move relative to said hollow shaft along the longitudinal axis thereof, said reciprocal shaft having a hole formed through a side wall thereof;

an annular piece mounted on said hollow shaft and formed with a hole which is located in alignment with the elongated slot of said hollow shaft and the hole of said reciprocal shaft;

a lock pin passed through the hole of said annular piece, the elongated slot of said hollow shaft and the hole of said reciprocal shaft to lock said annular piece and reciprocal shaft to each other;

a focus adjusting ring rotatably mounted on said hollow shaft; and rotation transmitting means operatively connecting said focus adjusting ring and said annular piece for transmitting the rotation of said focus adjusting ring to said annular piece and for converting said rotation to translation of said annular piece, hence to translation, by way of said lock pin, of said reciprocal shaft, whereby rotation of said focus adjusting ring causes said reciprocal shaft to move axially relative to said hollow shaft for focusing of the binocular.

2. The device of claim 1 wherein said translating means comprises an additional pin studded on an inside wall of said focus adjusting ring, said annular piece having a helical slot formed through an annular wall thereof to be engageable with said additional pin.

3. The focus adjusting device in accordance with claim 2, in which the helical slot is formed such that the focus adjusting ring is allowed to rotate an angular distance substantially less than one half the rotation, within a whole range of movement of the reciprocal shaft.

4. The focus adjusting device in accordance with claim 2, in which the helical slot is formed such that the focus adjusting ring is angularly movable 0–120 degrees within the whole range of movement of the reciprocal shaft.

5. The focus adjusting device in accordance with claim 2, in which the helical slot is formed such that the focus adjusting ring is angularly movable 0–180 degrees within the whole range of movement of the reciprocal shaft.

6. The focus adjusting device in accordance with claim 2, in which the helical slot is formed such that the focus adjusting ring is angularly movable for substantially one rotation within the whole range of movement of the reciprocal shaft.

7. The focus adjusting device in accordance with claim 2, in which the helical slot is formed such that the focus adjusting ring is angularly movable for substantially one and half rotations within the whole range of movement of the reciprocal shaft.

8. The focus adjusting device in accordance with claim 2, in which the helical slot is formed such that the focus adjusting ring is angularly movable for substantially two rotations within the whole range of movement of the reciprocal shaft.

9. The focus adjusting device in accordance with claim 2, in which the annular piece with the helical slot is removably mounted in the device.

10. A focus adjusting device for a binocular having a pair of object lens barrels each of which is formed with a pair of spaced front and rear connecting brackets, a pair of ocular lens barrels, and a pair of retaining brackets for retaining the ocular lens barrels, comprising:

a hollow cylindrical shaft fixedly mounted to the connecting brackets to interconnect the object lens barrels to each other, said hollow shaft having an elongated slot formed through a side wall thereof along the longitudinal axis thereof;

a reciprocal shaft received in said hollow shaft to move relative to said hollow shaft along the longitudinal axis thereof, said reciprocal shaft having a hole formed through a side wall thereof;

an annular piece in the form of a simple, hollow, open-ended cylinder removably mounted on said hollow shaft and formed with a hole which is located in alignment with the elongated slot of said hollow shaft and the hole of said reciprocal shaft and with a helical slot in an outer surface thereof;

a lock pin extending through the hole of said annular piece, the elongated slot of said hollow shaft and the hole of said reciprocal shaft to lock said annular piece and reciprocal shaft to each other;

a focus adjusting ring rotatably mounted on said hollow shaft and around said annular piece; and pin means projecting from an interior surface of said focus adjusting ring into said annular piece helical slot, for transmitting the rotation of said focus adjusting ring to said reciprocal shaft via said annular piece;

whereby rotation of said focus adjusting ring causes said repciprocal shaft to move relative to said hollow shaft for focusing of the binocular and whereby substitution of different annular pieces with helical slots of various pitches permits different occular lens feed rates.

* * * * *